United States Patent [19]

Pfau

[11] Patent Number: 4,747,639
[45] Date of Patent: May 31, 1988

[54] COVER FOR MOTOR VEHICLE SEATS

[75] Inventor: Dieter Pfau, Fürth, Fed. Rep. of Germany

[73] Assignee: Emil Bayer & Co. KG, Fürth, Fed. Rep. of Germany

[21] Appl. No.: 939,394

[22] Filed: Dec. 8, 1986

[30] Foreign Application Priority Data

Dec. 6, 1985 [DE] Fed. Rep. of Germany ....... 3543138

[51] Int. Cl.$^4$ .............................................. A47C 31/10
[52] U.S. Cl. .................................. 297/219; 297/284; 297/188
[58] Field of Search ............... 297/219, 284, 231, 188, 297/192

[56] References Cited

U.S. PATENT DOCUMENTS

| | | | |
|---|---|---|---|
| 1,083,797 | 1/1914 | Brown | 297/284 |
| 2,591,306 | 4/1952 | Sherman | 297/284 X |
| 3,086,817 | 4/1963 | Wilfert | 297/284 |
| 3,167,351 | 1/1965 | Butler | 297/219 X |
| 3,540,776 | 11/1970 | Wilson | 297/284 |

FOREIGN PATENT DOCUMENTS

| | | | |
|---|---|---|---|
| 1350522 | 12/1963 | France | 297/231 |
| 483941 | 2/1970 | Switzerland | 297/231 |

Primary Examiner—Francis K. Zugel
Attorney, Agent, or Firm—Browdy & Neimark

[57] ABSTRACT

To adapt a seat in a motor vehicle to the form of a sport seat, an additional seat part 7 is provided in the seat element 3 of a cover 1, pivotable to the front and back around a transverse pivot axis 6. Additional edged beadings at the seat element 3 or the back element 2 increase the adaptation to the character of a sport seat. Additionally, bags 9 can be attached or provided.

4 Claims, 1 Drawing Sheet

U.S. Patent  May 31, 1988  4,747,639
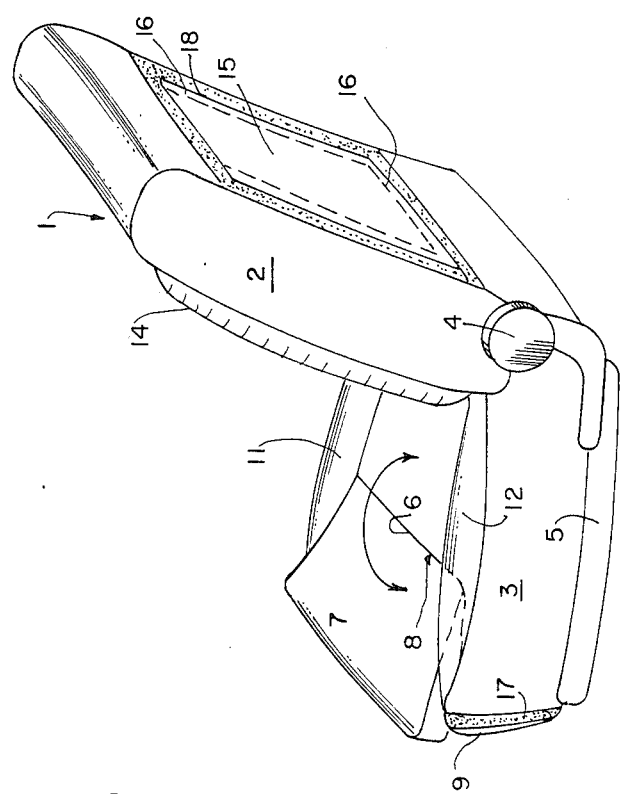
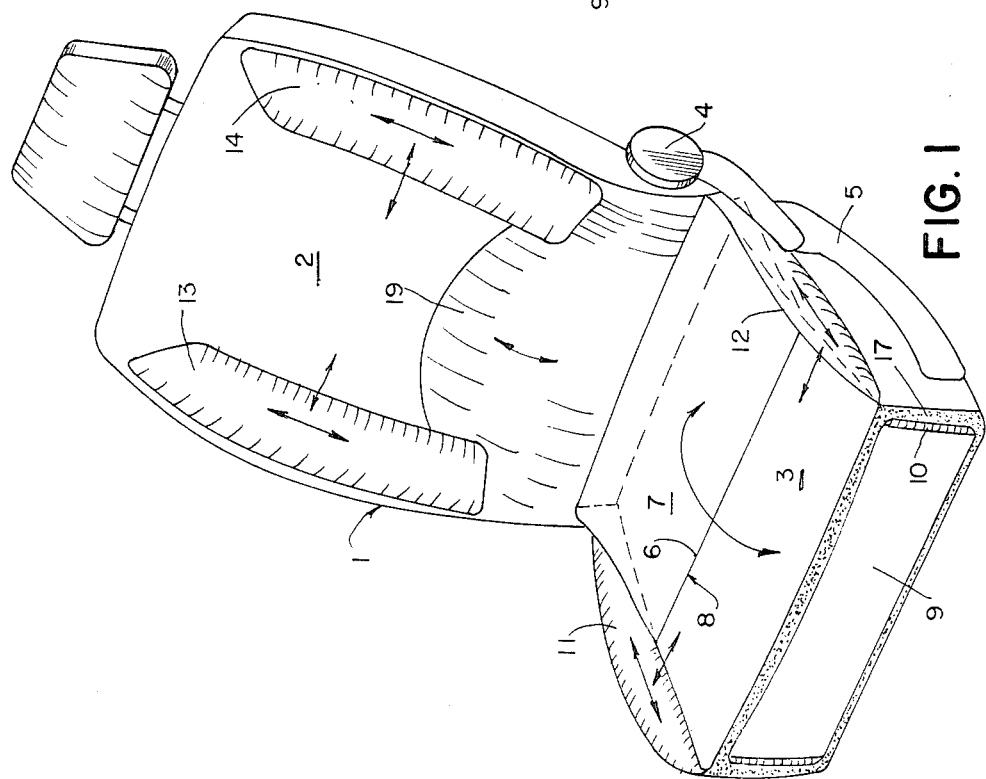

COVER FOR MOTOR VEHICLE SEATS

The invention relates to covers for seats of motor vehicles, consisting of a back element and a seat element of natural or plastic materials.

Covers which are later applied to seats of motor vehicles are known in a variety of styles. Such covers are used, for instance, as slip covers for the original seat covers in order to retain their surface and structure even after prolonged use of the associated motor vehicle. Furthermore, such covers or coverings are provided as heat insulation. In this case the covers preferably consist of a hide- or fur-like material. Finally, such covers are also used as decoration. Linen, leather, hides, fur or corresponding plastics can be used as materials for the said covers.

The purpose of the invention is to provide a cover which makes it possible to give a normal seat the appearance of a sport seat.

This purpose is generally achieved by means of the invention by providing an additional seat part at the seat element which is pivotable around a transverse pivot axis.

The transverse pivot axis is preferably disposed in the forward half of the seat element.

In an especially advantageous manner the additional seat part is disposed in the shape of a seat wedge, the narrow edge of which is at the transverse pivot axis. When the additional seat part provided according to the invention is pivoted towards the back, e.g. in the direction of the back element, an elevation of the seat surface results which is especially welcomed by shorter persons, since they now can see better over the steering wheel. If, on the other hand, the additional seat part is pivoted forward, the seat surface is lengthened in a forward direction, thereby offering an extended support surface for the thighs of the respective user.

The free space created under the seat surface when the additional seat part is pivoted forward can be advantageously used by attaching at the front end of the seat element a forward bag. This bag can be in the form of an open bag or as a pocket with closure means.

To fasten the bag at the front end of the seat element a Velcro-type fastening strip is advantageously provided on the bag. In accordance with another embodiment of the invention a velour element is provided as opposite surface for the Velcro-type fastening strip. The velour element can be a part of the cover or it can be additionally applied to the cover.

For further adaptation of the seat as a sport seat an edged beading is incorporated along the longitudinal edges of the seat element in a further embodiment of the invention.

In a corresponding manner edged beadings can also be incorporated in the side edges of the back element in accordance with a further embodiment of the invention.

In accordance with an improvement of the invention a rear bag is fastened at the back of the back element.

In accordance with a further characteristic of the invention the bag has at least one Velcro-type fastening strip. For the attachment of the rear bag by means of the Velcro-type fastening strip(s) at the back of the back element, a velour strip is provided as opposite surface for the Velcro-type fastener(s) of the bag. This velour strip can also be part of the cover or can be additionally applied to the cover at the appropriate spot.

In a further embodiment of the invention a lumbar support is provided in the lower part of the back element.

The cover in accordance with the invention can consist of a separate seat element and a separate back element. According to a preferred exemplary embodiment of the invention the seat and back parts are made in one piece.

Details, characteristics and advantages of the invention are further described by means of the drawing showing an exemplary embodiment. Shown are in:

FIG. 1—in a diagrammatic frontal view a cover in accordance with the invention applied to a motor vehicle seat, and FIG. 2—a cover in accordance with FIG. 1 in a diagrammatic oblique view from the rear.

In FIG. 1 a cover 1 in accordance with the invention is shown in connection with a motor vehicle seat. As known, the seat is on seat rails 5 which make possible a shifting of the seat in a longitudinal direction within the passenger compartment. The cover 1 has a back element 2 and a seat element 3, the tilt of the corresponding seat back can be adjusted continuously or in steps by means of a seat back adjustment device 4. An additional seat part 7, pivotable around a transverse pivot axis 6, is provided at the seat element 3. This additional seat part 7 is preferably wedge-shaped, its short edge being located in the area of the transverse pivot axis 6.

The additional seat part 7 is, as indicated by the double arrow, pivotable backwards, in the direction towards the back element 2, and forward towards the front edge of the seat element 3. If the additional seat part 7 is pivoted towards tbe back, the seating surface is thereby elevated, so that the respective user sits higher above the floor of the passenger compartment and thereby has an improved view through the windows of the motor vehicle, especially through the windshield.

However, if the additional seat part 7 is pivoted forward, the seating surface is elongated, especially because the transverse pivot axis 6 is located in the front half of the seat element 3. In the frontward position of the additional seat part 7, the seat in general has the characteristic of a sport seat with elongated support for the legs of the user and with a relatively lower seat surface.

To further adapt the seat provided with the cover 1 in accordance with the invention and preferably mass-produced as a sport seat, edged beadings 11 and 12 are incorporated in the side edges of the seat element 3.

In a further embodiment the rear element 2 also has lateral edged beadings 13 and 14. A lumbar support 19 can be incorporated in the lower part of the rear element 2.

In a manner known per se, the cover 1 can have openings for the insertion of a neck support into the seat back.

Since in the forward position of the additional seat part 7 a free space is created under the forward edge of the seat part 7 above the front part of the seat element 3, a front bag 9 can be provided in an advantageous manner on the seat element 3. This bag can be an open bag or a closable pocket and is advantageously connected with the lower part of the seat element 3 by means of a Velcro-type fastening strip 10 provided on the bag 9. To form a secure connection, it is also advantageous if this lower part of the seat element 3 has a velour covering or a velour element 17 as an opposite surface for the Velcro-type fastening strip of the front bag 9. In place of one Velcro-type fastening strip, several Velcro-type fastening strips may be provided.

In a corresponding manner it is possible to provide a rear bag 15 in the back of the seat back or of the back element 2. In this case, too, the bag 15 has at least one Velcro-type fastening strip 16 for the fastening on the back of the cover 1 or the covering of the rear element 2. For an improved contact of the rear bag 15 by means of the Velcro-type fastening strip 16, a velour element 18 is provided in an advantageous manner in the area of the rear bag 15. The velour element can be a part of the cover 1 or can be additionally provided.

The cover 1 in accordance with the invention can consist of separate back and seat elements. However, it can also be formed in one part or in one piece.

The additional seat part 7 can be provided as one part of the seat element 3 or it can be connected with the seat element 3 later as a separate part. The transverse pivot axis 6 can be formed by the front edge of the seat part 7 or as a fold in the seat element 3. It can also be incorporated as a pivot bar in the seat element 3. Otherwise the cover 1 can have, in a manner known per se, a design, decorations and/or quilted areas.

The invention, a pivotable additional seat part at the seat element, has been described above by means of a cover for seats. However, the invention can easily be used in connection with upholstery covers as initial equipment of such seats.

Therefore, the invention is not limited to the exemplary embodiments shown and described. It also includes all competent changes, developments, simplifications and uses, as well as partial or sub-combinations of the characteristics and steps described and/or shown.

I claim:
1. A cover for the seat of a motor vehicle comprising
   a seat element;
   a seat wedge pivotable about a transverse pivot axis and having a narrow edge of said widge pivotally attached at said transverse pivot axis transverse to said seat element;
   said transverse pivot axis transverse to said seat element at a location within the front half of said seat element;
   said seat wedge when extended in a forward direction from said transverse pivot axis extending beyond a front edge of said seat element wherein an elevation and extension of the surface of the seat provides thigh support;
   said seat wedge when extended in a backward direction from said transverse pivot axis extends to the back edge of the said seat element and provides an elevation of the surface of the seat whereby the occupant of the seat is seated in a raised position.
2. The cover for the seat of a motor vehicle of claim 1 further comprising
   a back element extending upward from said seat element at a back edge of said seat element;
   said seat wedge, when extended in a backward direction from said transverse pivot axis, extending no more than the distance to said back element.
3. The cover for the seat of a motor vehicle of claim 2 further comprising
   a lumbar support provided in a lower area of said back element;
   said seat wedge, when extended in a backward direction from said transverse pivot axis, pivotable past said lumbar support to the surface of said seat element.
4. The cover for the seat of a motor vehicle of claim 1 further comprising
   a bag attached to said seat element beneath a portion of said seat wedge extending beyond said front edge of said seat element.

* * * * *